US012676329B2

(12) United States Patent
Lee et al.

(10) Patent No.: US 12,676,329 B2
(45) Date of Patent: Jul. 7, 2026

(54) DEHYDROGENATION REACTION DEVICE AND CONTROL METHOD THEREOF

(71) Applicants: HYUNDAI MOTOR COMPANY, Seoul (KR); KIA CORPORATION, Seoul (KR); KOREA INSTITUTE OF SCIENCE AND TECHNOLOGY, Seoul (KR)

(72) Inventors: Jaeyong Lee, Seongnam-si (KR); Jin Woo Choung, Suwon-si (KR); Yongwoo Kim, Gunpo-si (KR); Jihui Seo, Ulsan (KR); Pyung Soon Kim, Suwon-si (KR); Yoondo Kim, Seoul (KR); Jaewon Kirk, Seoul (KR); Suk Woo Nam, Seoul (KR); Hyuntae Sohn, Seoul (KR); Yongmin Kim, Seoul (KR); Hyangsoo Jeong, Seoul (KR)

(73) Assignees: HYUNDAI MOTOR COMPANY, Seoul (KR); KIA CORPORATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 875 days.

(21) Appl. No.: 17/982,227

(22) Filed: Nov. 7, 2022

(65) Prior Publication Data
US 2024/0055635 A1 Feb. 15, 2024

(30) Foreign Application Priority Data
Aug. 11, 2022 (KR) ........................ 10-2022-0100353

(51) Int. Cl.
*H01M 8/065* (2016.01)
*B01J 4/00* (2006.01)
(Continued)

(52) U.S. Cl.
CPC ............. *H01M 8/065* (2013.01); *B01J 4/002* (2013.01); *B01J 14/00* (2013.01); *B01J 19/0013* (2013.01);
(Continued)

(58) Field of Classification Search
None
See application file for complete search history.

(56) References Cited

U.S. PATENT DOCUMENTS

2002/0083643 A1* 7/2002 Amendola ............... B01J 31/08
502/325
2004/0052722 A1* 3/2004 Jorgensen ............. H01M 8/065
423/648.1
(Continued)

FOREIGN PATENT DOCUMENTS

JP 6954525 B2 10/2021
KR 20200060846 A 6/2020

OTHER PUBLICATIONS

Soon-Mo Kwon et al., Development of a high-storage-density hydrogen generator using solid-state NaBH4 as a hydrogen source for unmanned aerial vehicles; Applied Energy; vol. 251; 2019; 9 pp.

*Primary Examiner* — Michael Forrest
(74) *Attorney, Agent, or Firm* — Lempia Summerfield Katz LLC

(57) ABSTRACT

A dehydrogenation reaction device is disclosed. The device includes a chemical hydride storage unit including a chemical hydride storage tank, a reaction unit including an acid aqueous solution storage tank, and a dehydrogenation reactor for generating hydrogen by reacting a chemical hydride with an acid aqueous solution. The device further includes a hydrogen storage unit including a hydrogen storage tank for storing the hydrogen produced in the dehydrogenation reac-
(Continued)

tor, and a recovery unit for recovering the product produced in the dehydrogenation reactor.

17 Claims, 4 Drawing Sheets

(51) Int. Cl.

| | |
|---|---|
| *B01J 14/00* | (2006.01) |
| *B01J 19/00* | (2006.01) |
| *B01J 19/26* | (2006.01) |
| *C01B 3/065* | (2026.01) |
| *H01M 8/04082* | (2016.01) |
| *H01M 8/0438* | (2016.01) |
| *H01M 8/04746* | (2016.01) |

(52) U.S. Cl.
CPC ............... *B01J 19/26* (2013.01); *C01B 3/065* (2013.01); *H01M 8/04201* (2013.01); *H01M 8/04425* (2013.01); *H01M 8/04753* (2013.01); *H01M 8/04776* (2013.01); *B01J 2219/00087* (2013.01)

(56) References Cited

U.S. PATENT DOCUMENTS

| | | | | |
|---|---|---|---|---|
| 2006/0269470 | A1* | 11/2006 | Zhang ............... | H01M 8/04216 |
| | | | | 423/648.1 |
| 2007/0138006 | A1* | 6/2007 | Oakes .................... | B60L 58/30 |
| | | | | 204/266 |
| 2007/0180815 | A1* | 8/2007 | Tangirala .................. | F02K 7/02 |
| | | | | 60/247 |
| 2009/0047185 | A1* | 2/2009 | Fennimore ............. | C01B 3/065 |
| | | | | 417/315 |
| 2021/0129105 | A1* | 5/2021 | Chia ................... | H01M 8/0606 |

* cited by examiner

DEHYDROGENATION REACTION DEVICE AND CONTROL METHOD THEREOF

CROSS-REFERENCE TO RELATED APPLICATION

This application claims priority to and the benefit of Korean Patent Application No. 10-2022-0100353 filed in the Korean Intellectual Property Office on Aug. 11, 2022, the entire contents of which are incorporated herein by reference.

BACKGROUND

(a) Technical Field

The present disclosure relates to a dehydrogenation reaction device for supplying hydrogen to a fuel cell and to a control method thereof.

(b) Description of the Related Art

Due to depletion of fossil energy and environmental pollution problems, there is a great demand for renewable and alternative energy. Hydrogen is attracting attention as one of such alternative energies.

A fuel cell and a hydrogen combustion device use hydrogen as a reaction gas. In order to apply the fuel cell and the hydrogen combustion device to vehicles and various electronic products for example, a stable and continuous supply technology of hydrogen is required.

In order to supply hydrogen to a device that uses hydrogen, a method of receiving hydrogen whenever hydrogen is needed from a separately installed hydrogen supply source may be used. In this way, compressed hydrogen or liquid hydrogen may be used.

Alternatively, a method of generating hydrogen through a reaction of a corresponding material after mounting a material in which hydrogen is stored on a device using hydrogen and supplying it to the device using hydrogen may be used. For this method, for example, a method of dissolving a solid hydride in an aqueous solution, a method of using adsorption and desorption (e.g., absorbents/carbon), a chemical method (e.g., chemical hydrogen storage), and the like have been proposed.

As an example, a system for producing hydrogen by injecting an acid solution into $NaBH_4$ is known. This hydrogen production system is a batch type system including an acid aqueous solution tank, a reactor including sodium borohydride ($NaBH_4$), a water separator, an acid purifier, and the like. In such a batch system, the product is accumulated in the reactor after the hydrogen generating reaction.

Therefore, because the hydrogen generating reaction-product is simultaneously accumulated in the conventional reactor, when the product needs to be discharged, the reactor itself needs to be removed and replaced, or the product needs to be recovered from the reactor.

When a small amount of $NaBH_4$ (SBH) is used, or the reactor is driven for small output, the reactor has a small size and thus may be easily replaced, but when more than several kg of SBH is reacted to increase an amount of hydrogen, a heavier and larger reactor has to be used, causing a problem of inconvenient replacement. This problem may be aggravated, as the reactor, which induces a higher-pressure reaction, needs to be thicker.

In particular, the product, when cooled to room temperature, is solidified/fixated and thereby difficult to clearly remove from the reactor and thus interfere with a restart reaction. The product may be melted by heating but requires a separate heat source, which increases energy consumed in the system.

In addition, because the solid-liquid hydrogen generating reaction is a non-uniform reaction, a hydrogen flow may be difficult to control. When all hydrogen generatable in the reactor is put into a high-pressure buffer tank without restarting, a volume of the buffer has to be increased.

SUMMARY

In an embodiment, a dehydrogenation reaction device is provided in which reactant injection, dehydrogenation reaction, and product recovery process may be independently separated to produce hydrogen as a continuous reaction. Also, the reactor and product recovery tank are separately configured to isolate the reactants and products to provide restartability. Accordingly, it is easy to replace the product storage tank, which does not have a more complicated injection part connection and internal structure than the reactor and does not require the application of thick material for high-pressure reaction. Also, the product may be easily removed, a weight of the system when water is removed from the product storage tank may be reduced, immediate output control is possible through flow control of chemical hydride aqueous solution, and a size of a reactor and a hydrogen storage tank through a continuous reaction may be reduced.

In another embodiment, a method for controlling a dehydrogenation reaction device is provided.

According to an embodiment, a dehydrogenation reaction device includes: a chemical hydride storage unit including a chemical hydride storage tank; a reaction unit including an acid aqueous solution storage tank, and a dehydrogenation reactor for generating hydrogen by reacting a chemical hydride with an acid aqueous solution; a hydrogen storage unit including a hydrogen storage tank for storing the hydrogen produced in the dehydrogenation reactor; and a recovery unit for recovering the product produced in the dehydrogenation reactor.

The chemical hydride storage tank may include a chemical hydride and a stabilizer including sodium hydroxide (NaOH), potassium hydroxide (KOH), lithium hydroxide (LiOH), cesium hydroxide (CsOH), or a combination thereof.

The chemical hydride storage unit may inject the chemical hydride directly from the chemical hydride storage tank into the dehydrogenation reactor.

The chemical hydride storage unit may further include a water storage tank and a mixer for preparing a chemical hydride aqueous solution by mixing the chemical hydride and water.

The chemical hydride storage unit may supply a chemical hydride aqueous solution to the dehydrogenation reactor.

The chemical hydride aqueous solution may include 20 wt. % to 80 wt. % of a chemical hydride, 1 wt. % to 10 wt. % of a stabilizer, and a balance amount of water.

The chemical hydride aqueous solution may be injected into the dehydrogenation reactor simultaneously with the acid aqueous solution or may be injected into the dehydrogenation reactor after the acid aqueous solution is injected first.

The chemical hydride aqueous solution and the acid aqueous solution may be in contact with each other within 3 seconds after injection into the dehydrogenation reactor.

The dehydrogenation reactor may include a first nozzle configured to spray a chemical hydride aqueous solution, and a second nozzle configured to spray an acid aqueous solution.

The first nozzle or the second nozzle may include a radial injector for atomizing the chemical hydride aqueous solution or the acid aqueous solution.

The chemical hydride aqueous solution may be heated to a temperature in a range of 30° C. to 80° C. and injected into the dehydrogenation reactor.

The reaction unit may further include a cooling water storage tank for maintaining a temperature of the dehydrogenation reactor at a temperature in a range of 100° C. to 400° C.

The hydrogen storage unit may further include a moisture trap, a methanator, a filter, or a combination thereof for separating hydrogen from the mixed gas produced in the dehydrogenation reactor at the front end of the hydrogen storage tank.

The recovery unit may recover a product from the dehydrogenation reactor in a liquid state when the temperature of the product is greater than or equal to 40° C.

The recovery unit may include a product storage tank configured to receive the mixed gas and product produced in the dehydrogenation reactor, and then transfer the mixed gas to the front end of the hydrogen storage unit.

The product storage tank may be discharged by evaporating moisture contained in the product.

The recovery unit may dissolve and discharge a product by injecting a solvent of greater than or equal to 40° C. into the product storage tank.

According to another example embodiment, a control method of the dehydrogenation reaction device includes: (a) determining whether hydrogen supply is required to the fuel cell, (b) when hydrogen supply is required to the fuel cell, determining whether a pressure in the hydrogen storage tank is less than a reference pressure, (c) when the pressure of the hydrogen storage tank is less than the reference pressure, mixing a chemical hydride and water to prepare a chemical hydride aqueous solution, (d) determining whether an internal pressure of the dehydrogenation reactor is less than a predetermined limit pressure, (e) when the internal pressure of the dehydrogenation reactor is less than the predetermined limit pressure, injecting the chemical hydride and an acid aqueous solution into the dehydrogenation reactor to perform a dehydrogenation reaction, (f) determining whether the internal pressure of the dehydrogenation reactor is greater than the internal pressure of the hydrogen storage tank, (g) when the internal pressure of the dehydrogenation reactor is greater than the internal pressure of the hydrogen storage tank, supplying hydrogen produced in the dehydrogenation reactor to the hydrogen storage tank, and returning to step (f), (h) when the internal pressure of the dehydrogenation reactor is not greater than the internal pressure of the hydrogen storage tank, stopping the injection of the chemical hydride aqueous solution and the acid aqueous solution into the dehydrogenation reactor and transferring the hydrogen in the hydrogen storage tank to the fuel cell, (i) determining whether the internal pressure of the dehydrogenation reactor is less than the product discharge pressure, (j) when the internal pressure of the dehydrogenation reactor is not less than the product discharge pressure, returning to step (g), (k) when the internal pressure of the dehydrogenation reactor is less than the product discharge pressure, transferring the mixed gas and the product in the dehydrogenation reactor to a product storage tank, transferring the mixed gas in the product storage tank to a hydrogen storage unit, and then returning to step (a), and (l) terminating the operation when hydrogen supply to the fuel cell is not required.

In step (b), the reference pressure is a pressure that can be supplied to the fuel cell above atmospheric pressure.

In step (d), the predetermined limit pressure may be a maximum allowable pressure at which the dehydrogenation reactor is pressurized by hydrogen.

In step (f), the internal pressure of the hydrogen storage tank may be a normal pressure to a predetermined limit pressure.

In step (i), the product discharge pressure may be a minimum pressure at which the product can be automatically discharged from the dehydrogenation reactor using a mixed gas.

The reference pressure may be in a range of 10 bar to 20 bar.

The product discharge pressure may be in a range of 1 bar to 10 bar.

In step (b), when the pressure of the hydrogen storage tank is not less than the reference pressure, the method may move to step (h) of supplying hydrogen from the hydrogen storage tank to the fuel cell.

In step (d), when the internal pressure of the dehydrogenation reactor is not less than the set limit pressure, the method may move to step (f) of determining whether the internal pressure of the dehydrogenation reactor is greater than the internal pressure of the hydrogen storage tank.

In the dehydrogenation reaction device according to an embodiment, reactant injection, dehydrogenation reaction, and product recovery process may be independently separated to produce hydrogen as a continuous reaction, and the reactor and product recovery tank are separately configured to isolate the reactants and products to provide restartability. Accordingly, it is easy to replace the product storage tank, which does not have a more complicated injection part connection and internal structure than the reactor, and does not require the application of thick material for high-pressure reaction, the product may be easily removed, a weight of the system when water is removed from the product storage tank may be reduced, immediate output control is possible through flow control of chemical hydride aqueous solution, and a size of a reactor and a hydrogen storage tank through a continuous reaction may be reduced.

DETAILED DESCRIPTION

Figure 1:
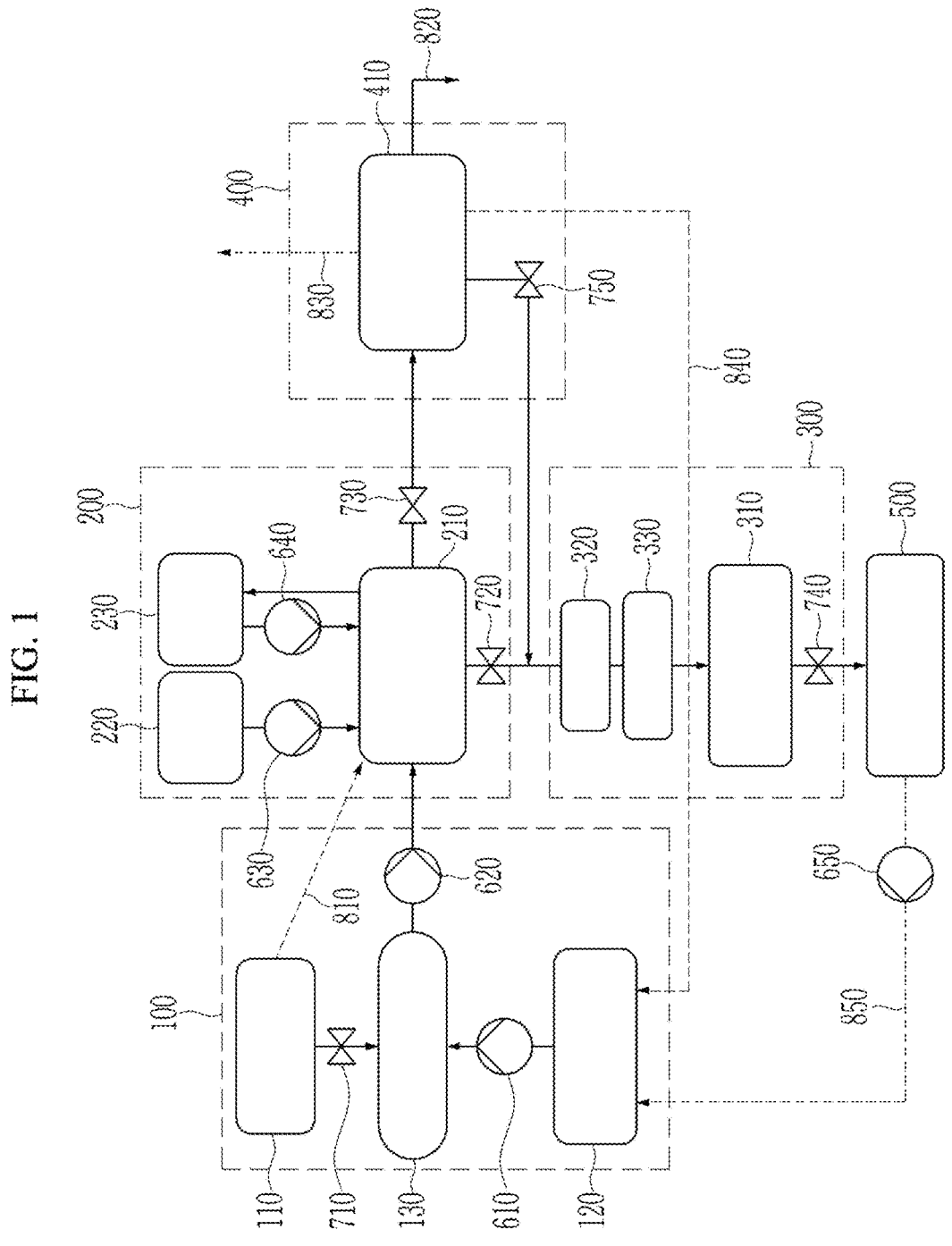
FIG. 1 is a view schematically showing a dehydrogenation reaction device according to an embodiment.

The advantages, features, and aspects to be described hereinafter are apparent from the following description of the embodiments with reference to the accompanying drawings, which is set forth hereinafter. However, the present disclosure may be not limited to embodiments that are described herein. Although not specifically defined, all of the terms including the technical and scientific terms used herein have meanings understood by ordinary persons skilled in the art. The terms have specific meanings coinciding with related technical references and the present specification as well as lexical meanings. That is, the terms are not to be construed as having idealized or formal meanings. Throughout the specification and claims which follow, unless explicitly described to the contrary, the word "comprise/include" or variations such as "comprises/includes" or "comprising/including" is understood to imply the inclusion of stated elements but not the exclusion or any other elements.

The terms of a singular form may include plural forms unless referred to the contrary.

In the drawings, the thickness of layers, films, panels, regions, etc., are exaggerated for clarity. Like reference numerals designate like elements throughout the specification.

When an element such as a layer, film, region, or substrate is referred to as being "on" another element, it can be directly on the other element or intervening elements may also be present. In contrast, when an element is referred to as being "directly on" another element, there are no intervening elements present.

FIG. 1 is a schematic view showing a dehydrogenation reaction device according to an embodiment.

The dehydrogenation reaction device includes a chemical hydride storage unit 100, a reaction unit 200, a hydrogen storage unit 300, and a recovery unit 400.

The chemical hydride storage unit 100 includes a chemical hydride storage tank 110 including chemical hydride.

For example, the chemical hydride may be charged into the chemical hydride storage tank 110 in a solid state.

For example, the chemical hydride in the solid state may be in the form of any one of powders, granules, beads, microcapsule, and pellets. When chemical hydride is stored in an aqueous solution state (e.g., a concentration of chemical hydride of 20%), a large amount of chemical hydride cannot be stored, but when chemical hydride is stored in a solid state, large-capacity storage may be possible.

The chemical hydride may be any compound that is hydrolyzed to produce hydrogen and a hydrolysate, for example, sodium borohydride ($NaBH_4$), lithium borohydride ($LiBH_4$), potassium borohydride ($KBH_4$), ammonium borohydride ($NH_4BH_4$), ammonia borane ($NH_3BH_3$), tetramethyl ammonium borohydride (($CH_3)_4NH_4BH_4$), sodium aluminum hydride ($NaAlH_4$), lithium aluminum hydride ($LiAlH_4$), potassium aluminum hydride ($KAlH_4$), calcium borohydride ($Ca(BH_4)_2$), magnesium borohydride ($Mg(BH_4)_2$), sodium gallium hydride ($NaGaH_4$), lithium gallium hydride ($LiGaH_4$), potassium gallium hydride ($KGaH_4$), lithium hydride ($LiH$), calcium hydride ($CaH_2$), magnesium hydride ($MgH_2$), or a mixture thereof.

The chemical hydride storage tank 110 may include an alkali hydroxide further including sodium hydroxide ($NaOH$), potassium hydroxide ($KOH$), lithium hydroxide ($LiOH$), cesium hydroxide ($CsOH$), or a combination thereof as a stabilizer, together with the chemical hydride.

The chemical hydride storage unit 100 may further include a water storage tank 120 and a mixer 130.

The water storage tank 120 stores water, and the mixer 130 is supplied with the chemical hydride from the chemical hydride storage tank 110 and with the water from the water storage tank 120. Then the chemical hydride and the water are mixed, preparing a chemical hydride aqueous solution. The mixer 130 may prepare the chemical hydride aqueous solution by heating and stirring the chemical hydride and the water in order to mix them.

The chemical hydride aqueous solution may include 20 wt. % to 80 wt. % of the chemical hydride, 1 wt. % to 10 wt. % of a stabilizer, and a balance amount of the water and, for example, at a room temperature (e.g., 20° C.), 20 wt. % to 35 wt. % of the chemical hydride, 1 wt. % to 5 wt. % of the stabilizer, and a balance amount of the water. At a higher temperature than the room temperature, the chemical hydride and the stabilizer may be dissolved in a higher concentration. In the room temperature environment, when the content of the chemical hydride is less than 20 wt. % in the chemical hydride aqueous solution, the chemical hydride may be sufficiently dissolved but reduce a hydrogen storage in terms of the system, and when the content is greater than 35 wt. %. Also, the chemical hydride may be precipitated in the aqueous solution due to the overconcentration, and the aqueous solution may be difficult to quantitatively inject. When the content of the stabilizer is less than 1 wt. %, hydrogen bubbles may be generated due to the reaction of the chemical hydride and the water. Further, the aqueous solution may be difficult to quantitatively inject, but when the content is greater than 5 wt. %, an acid aqueous solution may be additionally injected thereinto to adjust pH for hydrogen generation. However, for long-term storage of the chemical hydride aqueous solution, the stabilizer may be added up to 40 wt. % at maximum.

For example, the chemical hydride storage unit 100 may inject the chemical hydride directly from the chemical hydride storage tank 110 to the dehydrogenation reactor 210 (810) or supply the chemical hydride aqueous solution to the dehydrogenation reactor 210.

The chemical hydride in a solid state may be transported by using pneumatics or gravity or using a metering device equipped with a mechanically moving part. For example, the chemical hydride storage unit 100 may include a first valve 710 for transporting the chemical hydride from the chemical hydride storage tank 110 to the mixer 130 or the dehydrogenation reactor 210.

In addition, the chemical hydride storage unit 100 may further include a first pump 610 for transporting the water from the water storage tank 120 to the mixer 130 and a second pump 620 for transporting the chemical hydride aqueous solution to the dehydrogenation reactor 210.

The reaction unit 200 includes an acid aqueous solution storage tank 220 and a dehydrogenation reactor 210.

The acid aqueous solution storage tank 220 stores the acid aqueous solution.

The acid may be an inorganic acid such as sulfuric acid, nitric acid, phosphoric acid, boric acid, or hydrochloric acid, an organic acid such as heteropoly acid, acetic acid, formic acid, malic acid, citric acid, tartaric acid, ascorbic acid, lactic acid, oxalic acid, succinic acid, tauric acid, or a mixture thereof, because the molecular weight is small compared to proton. Also, the system weight may be reduced and formic acid ($HCOOH$) may be used as it is safer than hydrochloric acid in a high concentration state. In the case of formic acid, as a weak acid, the pH is maintained at 2 under the conditions described in the present disclosure, so it may be used safely. In addition, captured carbon dioxide may be obtained through hydrogenation, so it is an important material in terms of a recycling/recycling of carbon dioxide. In addition, formate is converted to bicarbonate through a dehydrogenation reaction, whereby additional hydrogen may be obtained.

The acid aqueous solution storage may have a corrosion-resistant protective layer such as TEFLON (tetrafluoroethylene) coating to prevent corrosion by the first acid aqueous solution.

In the dehydrogenation reactor 210, a dehydrogenation reaction in which hydrogen is produced by a hydrolysis reaction of a chemical hydride by the acid aqueous solution proceeds. The acid aqueous solution adjusts the pH of the chemical hydride so that the dehydrogenation reaction may be promoted.

For example, when the chemical hydride is $NaBH_4$ and the acid is HCOOH, the dehydrogenation occurs, as shown in Reaction Formula 1.

$$NaBH_4+0.5HCOOH+(3.5)H_2O \rightarrow 0.5NaHCO_2+0.25 (Na_2B_4O_7 \cdot 5H_2O)+4H_2+0.5H_2O \qquad (1)$$

The chemical hydride aqueous solution may be injected into the dehydrogenation reactor 210 at the same time as the acid aqueous solution or after first injecting the acid aqueous solution. Herein, the chemical hydride aqueous solution may be heated to a temperature in a range of 30° C. to 80° C. to prevent precipitation and then, injected into the dehydrogenation reactor 210.

The dehydrogenation reactor 210 may include a first nozzle for spraying the chemical hydride aqueous solution and a second nozzle for spraying the acid aqueous solution. The first nozzle and the second nozzle may be disposed close to each other so that the chemical hydride aqueous solution and the acid aqueous solution may contact within 3 seconds after discharging the water or induce rapid injection. In addition, the first nozzle or the second nozzle includes a radial injector at the nozzle tip to induce a uniform reaction through atomization of the chemical hydride aqueous solution or the acid aqueous solution.

In the dehydrogenation reactor 210, the acid may react in a mole ratio in a range of 0.25 to 1 based on 1 mole of the chemical hydride, and water may react in a mole ratio of 2 to 4 based on 1 mole of the chemical hydride. When the mole ratio of the acid is less than 0.25 or the mole ratio of water is less than 2, the conversion rate may decrease, and when the mole ratio of the acid exceeds 1 or the mole ratio of the water exceeds 4, the hydrogen storage capacity may decrease.

When the acid aqueous solution is used to generate hydrogen from the chemical hydride, water is easily vaporized due to an exothermic reaction (a water vaporization temperature: 100° C. @ 1 bar), so that the amount of produced hydrogen (e.g., a hydrogen storage capacity) may be deteriorated.

Therefore, the dehydrogenation reaction may take place under high-temperature and high-pressure conditions. This prevents vaporization of water and reduces the amount of the used water, thereby maximizing the amount of produced hydrogen (water vaporization temperature: 175° C. @ 10 bar, 260° C. @ 50 bar). In addition, the generation of $CO_2$ may also be suppressed through the pressurization operation of the dehydrogenation reactor 210.

Also, if excess water is included in a hydrogen gas after the reaction, a separate gas-liquid separator is required, Accordingly, the volume and weight of the entire system may be increased and then the hydrogen storage capacity may be decreased, but high-temperature and high-pressure operation of the dehydrogenation reactor 210 may increase the hydrogen storage capacity and reduce the system cost and weight.

For example, in the case of the system using $NaBH_4$ and formic acid (HCOOH), the temperature of the dehydrogenation reaction may be in a range of 10° C. to 400° C., or 100° C. to 250° C. When the temperature of the dehydrogenation reaction is less than 10° C., the acid or acid aqueous solution may be coagulated or separated, and when the temperature exceeds 400° C., a side reaction such as an occurrence of carbon monoxide may increase.

The pressure of the dehydrogenation reaction may be in a range of 1 bar to 100 bar, or 5 bar to 50 bar. If the pressure of the dehydrogenation reaction is less than 1 bar, a decompression pump is required, which may unnecessarily increase the system weight. If it exceeds 100 bar, the weight and volume of a high-temperature/high-pressure container may increase.

Accordingly, the gas product produced in the dehydrogenation reactor 210 may contain 99 volume % or more of hydrogen, 1 volume % or less of water, and 0.1 volume % or less of other impurities.

The dehydrogenation reactor 210 may be configured as a high-temperature and high-pressure vessel so that the dehydrogenation reaction may be performed under high-temperature and high-pressure conditions. For example, the dehydrogenation reactor 210 may have a shape such as a cylinder, a sphere, a cuboid, or a polygonal prism, and in particular may have a cylindrical shape.

The reaction unit 200 may include a heating device (not shown) that provides heat/temperature necessary for hydrolysis of chemical hydride or a separate purpose, or a cooling device (not shown) for discharging reaction heat when the hydrogen generating reaction is an exothermic reaction. For example, the heating device may use electricity or other heat source, and the cooling device may be implemented as a cooling water storage tank 230 to discharge heat generated by hydrolysis of chemical hydride. The cooling water storage tank 230 may maintain, for example, the temperature of the dehydrogenation reactor 210 in a range of 100° C. to 400° C.

The reaction unit 200 may include a third pump 630 between the acid aqueous solution storage tank 220 and the dehydrogenation reactor 210. The third pump 630 supplies the acid aqueous solution from the acid aqueous solution storage tank 220 to the dehydrogenation reactor 210 and may control a supply flow of the acid aqueous solution. The third pump 630 may be disposed on a line connecting the acid aqueous solution storage tank 220 and the dehydrogenation reactor 210.

In addition, the reaction unit 200 may include a fourth pump 640 between the cooling water storage tank 230 and the dehydrogenation reactor 210. The fourth pump 640 supplies cooling water from the cooling water storage tank 230 to the dehydrogenation reactor 210 and may control a supply flow of the cooling water. The fourth pump 640 may be disposed in a line connecting the cooling water storage tank 230 with the dehydrogenation reactor 210.

In addition, the reaction unit 200 may include a second valve 720 for discharging pressurized hydrogen (e.g., 2 bar or more) in the dehydrogenation reactor 210 to the hydrogen storage unit 300 and a fourth valve 730 for transporting the product to the recovery unit 400 by using the pressurized hydrogen or gravity. The reaction unit 200 may include a pump (not shown) for transporting the product to the recovery unit 400 instead of the fourth valve 730.

The hydrogen storage unit 300 includes a hydrogen storage tank 310 for storing hydrogen produced in the dehydrogenation reactor 210. The hydrogen storage tank 310 receives and stores a predetermined amount of hydrogen gas. For example, the hydrogen storage tank 310 may be a buffer tank.

The hydrogen storage unit 300 may further include a water trap 320, a methanator 330, a filter, or a combination thereof, for separating hydrogen from the mixed gas produced in the dehydrogenation reactor 210 at the front end of the hydrogen storage tank 310 (not shown).

As an example, the methanator 330 converts carbon monoxide produced as a by-product into methane when hydrogen is produced by a dehydrogenation reaction of a chemical hydride and an acid aqueous solution. The methanator 330 may be disposed between the dehydrogenation reactor 210 and the hydrogen storage tank 310.

The methanator 330 may include a gas conduit fluidly connected to the gas outlet of the dehydrogenation reactor 210, and a catalyst provided in the gas conduit. The catalyst may include at least one of nickel (Ni), ruthenium (Ru), cobalt (Co), rhodium (Rh), and iron (Fe). The catalyst is in a solid state, and for example, may be in the form of any one of granules, beads, microcapsules, and pellets. Such a catalyst is filled in the gas conduit and, as the gases of hydrogen and carbon monoxide discharged from the dehydrogenation reactor 210 pass through the catalyst, carbon monoxide is converted into methane. The methanation of carbon monoxide occurs under high temperature conditions. For example, when a nickel catalyst is used, the methanation reaction takes place at 300° C. or higher, and at 340° C., most of carbon monoxide is converted into methane.

The recovery unit 400 recovers the product produced in the dehydrogenation reactor 210 and stores it in the product storage tank 410.

For example, the product may be sodium hydrogen carbonite ($NaHCO_2$), sodium tetraborate pentahydrate or Borax ($Na_2B_4O_7 \cdot 5H_2O$), and water ($H_2O$) produced by the dehydrogenation reaction in Reaction Formula 1.

Because the removal is cumbersome when the product is solidified by cooling to room temperature in the dehydrogenation reactor 210, it can be recovered when the product is in a liquefied state at a temperature of greater than or equal to 40° C., or greater than or equal to 80° C.

The product storage tank 410 may include a fifth valve 750 for receiving and temporarily storing the mixed gas and product produced in the dehydrogenation reactor 210, and then transferring the mixed gas to the front end of the hydrogen storage unit 300.

The recovery unit 400 may include a drain valve 820 configured to dissolve and discharge the product by injecting a solvent of greater than or equal to 40° C., for example, hot water or a product solution (glycol), into the product storage tank 410. Alternatively, it is also possible to replace the product storage tank 410 itself as a cartridge.

In addition, the recovery unit 400 may reduce a weight of the product by evaporating and discharging moisture resulting from the product as needed (830) or moisture may be transferred to the water storage tank 120 for recycling (840).

The dehydrogenation device may further include a fuel cell 500.

The fuel cell 500 is located downstream of the hydrogen storage unit 400 and receives hydrogen gas from the hydrogen storage unit 400.

The fuel cell 500 generates water by reacting the supplied hydrogen with oxygen and simultaneously generates electrical energy. The water produced in the fuel cell 500 is discharged through exhaust devices or mechanisms such as valves.

Alternatively, the water produced in the fuel cell 500 may be recovered and stored in the water storage tank 120 (850). In this case, the amount of water supplied to the water storage tank 120 may be adjusted by the fifth pump 650. Through this, because only a small tank capable of storing water is required, the volume and weight may be reduced to increase the hydrogen storage capacity of the dehydrogenation reaction device.

The fuel cell 500 may be any device that converts the hydrogen gas into usable electrical energy. For example, the fuel cell 500 may be a proton exchange membrane fuel cell (PEMFC), an alkaline fuel cell (AFC), a phosphoric acid fuel cell (PAFC), a molten carbonate salt fuel cell (MCFC), or a solid oxide fuel cell (SOFC), etc., but the present disclosure is not limited thereto.

For example, the fuel cell 500 may pass the generated electrical energy through a power converter such as a DC converter, an inverter, or a charge controller. The power converter may output a portion of the electrical energy to an electrical load through a load interconnect, and the other portion of the electrical energy may be sent back to the energy storage through a recharging interconnect. Another portion of the electrical energy may be used to supply power to a control unit.

The dehydrogenation reaction device may transfer heat (e.g., 80° C.) generated from the fuel cell 500, the dehydrogenation reactor 210, or a combination thereof to the water storage tank 120, efficiently preventing the water from freezing or melting the frozen water even at a low temperature to inject a required amount of water to the reactor without delay.

If necessary, the dehydrogenation reaction device may further include a pressure regulator (not shown) between the dehydrogenation reactor 210 and the hydrogen storage unit 300 and a mass flow meter (not shown) between the hydrogen storage unit 400 and the fuel cell 500.

In addition, the dehydrogenation reactor 210 may further include a sensor, a thermometer, or a pressure gauge inside or outside. Thereby, hydrogen gas may be stored in the hydrogen storage unit 400 at a constant pressure, and hydrogen gas may be supplied to the fuel cell 500 at a desired pressure and mass.

The conventional batch-type reactor may not often be restarted due to a product cooled to room temperature, but the dehydrogenation reaction device according to an embodiment may secure restartability by separating the reactant from the product.

In addition, when a cooling coil or the like is present inside the conventional batch-type reactor, the product, when solidified by cooling to room temperature, may hardly be removed due to the internal structure. However, in the dehydrogenation reaction device according to an embodiment, the product storage tank provided separately from the reactor has no complicated connection of an injection unit, no internal structure, and no need to apply a thick material for a high-pressure reaction and thus may be easy to replace and also, convenient to remove a product. In addition, when the product storage tank also has a moisture removal function, a weight of the device may be reduced.

Furthermore, a conventional batch-type reaction is an uneven reaction between solid chemical hydride and liquid reactant, causing severe fluctuations in a hydrogen flow. However, when the chemical hydride and the acid aqueous solution are simultaneously injected and reacted, the hydrogen flow is stabilized due to a reaction between aqueous solutions, and a flow of the aqueous solutions may be adjusted immediately to adjust and control an output.

In addition, because the conventional batch-type reactor is difficult to restart, the reactor is larger because the hydrogen storage tank has to be exponentially larger to store the hydrogen all at once reacted in the hydrogen storage tank. However, the dehydrogenation reaction device according to an embodiment enables a continuous reaction, even if small, a size of the hydrogen storage tank also may be adjusted.

Figure 2:
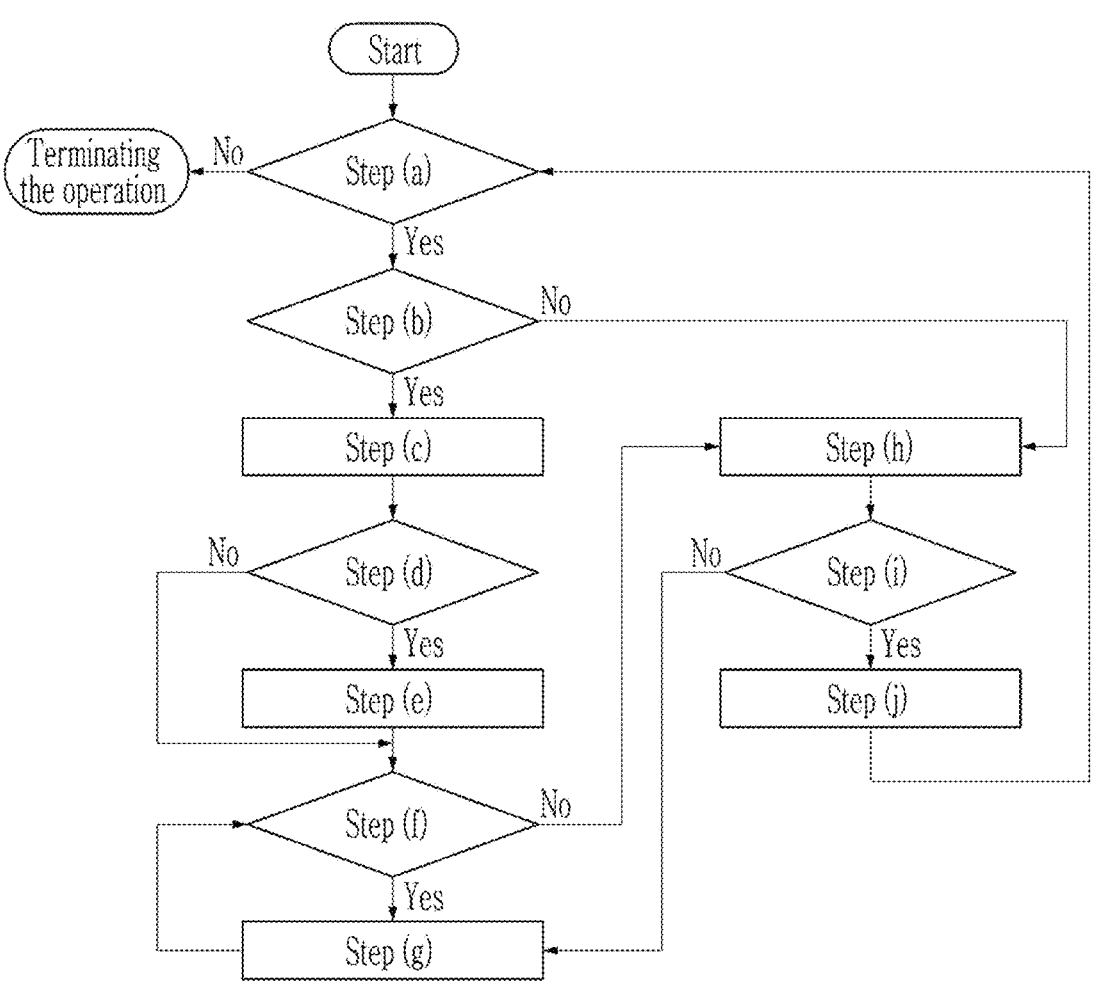
FIG. 2 is a flowchart illustrating a control method of a dehydrogenation reaction device according to another embodiment.

FIG. 2 is a flowchart illustrating a control method of a dehydrogenation reaction device according to another embodiment. Hereinafter, with reference to FIG. 2, the control method of the dehydrogenation reaction device is described.

First, in step (a), it is determined whether hydrogen is required to be supplied to the fuel cell.

In step (b), when the fuel cell needs to supply hydrogen, it is determined whether the pressure in the hydrogen storage tank is less than the reference pressure. The reference pressure may be a pressure that can be supplied to the fuel cell above atmospheric pressure, and may be, for example, in a range of 10 bar to 20 bar.

When the pressure of the hydrogen storage tank is not less than the reference pressure, the process moves to step (h) of supplying hydrogen from the hydrogen storage tank to the fuel cell.

When the pressure of the hydrogen storage tank is less than the reference pressure, the process moves to step (c) to prepare a chemical hydride aqueous solution by mixing the chemical hydride with water. However, the chemical hydride aqueous solution may be prepared in advance if necessary.

In step (d), it is determined whether the internal pressure of the dehydrogenation reactor is less than a predetermined limit pressure. The predetermined limit pressure is a maximum allowable pressure at which the dehydrogenation reactor is pressurized by hydrogen, and may be set, for example, with a back pressure regulator.

When the internal pressure of the dehydrogenation reactor is not less than the predetermined limit pressure, the process may move to step (f) of determining whether the internal pressure of the dehydrogenation reactor is greater than the internal pressure of the hydrogen storage tank.

When the internal pressure of the dehydrogenation reactor is less than the set limit pressure, the process may move to step (e), and the dehydrogenation reaction is performed by injecting a chemical hydride and an acid aqueous solution into the dehydrogenation reactor. At this time, the internal pressure of the dehydrogenation reactor may start to rise, and thermal management control may be started.

In step (f), it is determined whether the internal pressure of the dehydrogenation reactor is greater than the internal pressure of the hydrogen storage tank.

When the internal pressure of the dehydrogenation reactor is greater than the internal pressure of the hydrogen storage tank, the process moves to step (g), and the hydrogen produced in the dehydrogenation reactor is supplied to the hydrogen storage tank, and the process returns to step (f).

When the internal pressure of the dehydrogenation reactor is not greater than the internal pressure of the hydrogen storage tank, the process moves to step (h), the injection of the chemical hydride aqueous solution and the acid aqueous solution into the dehydrogenation reactor is stopped, and hydrogen from the hydrogen storage tank is supplied to the fuel cell.

In step (i), it is determined whether the internal pressure of the dehydrogenation reactor is less than the product discharge pressure. The product discharge pressure is a minimum pressure at which the product can be automatically discharged from the dehydrogenation reactor using a mixed gas, and may be, for example, in a range of 1 bar to 10 bar.

When the internal pressure of the dehydrogenation reactor is not less than the product discharge pressure, in step (j), the process returns to step (g), hydrogen produced in the dehydrogenation reactor is supplied to a hydrogen storage tank, and then the process returns to step (f).

When the internal pressure of the dehydrogenation reactor is less than the product discharge pressure, the process moves to step (k), the mixed gas and product in the dehydrogenation reactor is transferred to the product storage tank, the mixed gas in the product storage tank is transferred to the hydrogen storage unit, and then the process returns to step (a).

After returning to step (a), it is determined whether or not hydrogen supply is required to the fuel cell and if the fuel cell does not require hydrogen supply, the process moves to step (k) and the operation is terminated.

Hereinafter, specific examples of the present disclosure are presented. However, the examples described below are only for specifically illustrating or explaining the present disclosure, and the scope of the disclosure is not limited thereto.

Experimental Example 1: Reaction Result Between Chemical Hydride Aqueous Solution and Acid Aqueous Solution A NaBH$_4$ (SBH) aqueous solution as a chemical hydride and a formic acid (FA) aqueous solution as an acid aqueous solution are used in a ratio of SBH:FA:water=1:0.2:3.8 mol to perform a reaction under an internal pressure of 40 bars, wherein the SBH aqueous solution (SBH:water=1:3.6 mol), the FA aqueous solution (FA:water=0.2:0.2 mol) are used based on 5 g of SBH, under the conditions of Table 1, and the results are shown in FIG. 3.

TABLE 1

| SBH content (kg) | Injection order of aqueous solution | Injection time (min) | Insulation or not | Line heater temperature (° C.) | Cooling water flow rate (LPM, 20° C. water) | Conversion rate (%) |
|---|---|---|---|---|---|---|
| 0.005 | Addition of SBH aqueous solution to FA aqueous solution | 5 | No | 25 (room temperature) | No separate cooling | 99 (Based on injection amount) |

Figure 3:
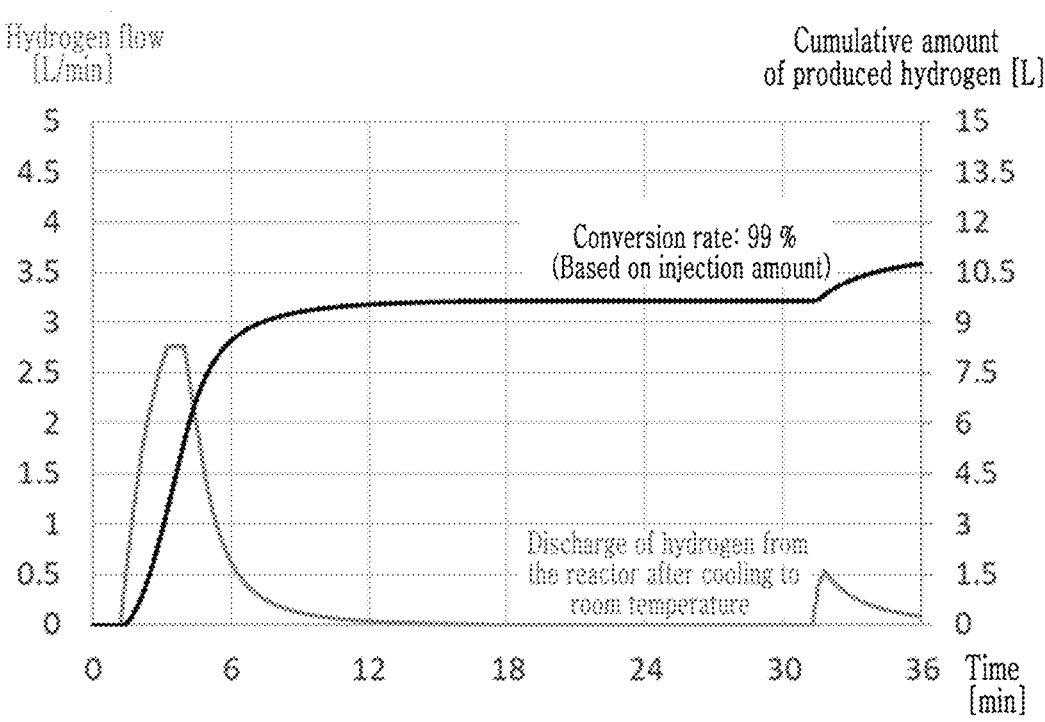
FIG. 3 is a graph showing a reaction result between a chemical hydride aqueous solution and an acid aqueous solution in Experimental Example 1.

Referring to FIG. 3, the injected SBH aqueous solution all participate in the hydrogen generating reaction (conversion rate: 99%).

In addition, immediately after the reaction, a product is confirmed to be liquefied sufficiently enough to be poured out by gravity and thus, may be able to be transferred from the reactor to the recovery unit more cleanly than pushed by a pressurized hydrogen-containing mixed gas.

Accordingly, because there is no separate product in the reactor after the recovery, new SBH or SBH aqueous solution is injected to restart the reactor.

Experimental Example 2: Evaluation Result of Simultaneous Injection Between Chemical Hydride Aqueous Solution and Acid Aqueous Solution An NaBH$_4$(SBH) aqueous solution as a chemical hydride and a formic acid (FA) aqueous solution as an acid aqueous solution are used in a ratio of SBH:FA:water=1:0.2:3.8 mol to perform a reaction under an internal pressure of 40 bar and the SBH aqueous solution (SBH:water=1:3.6 mol, addition of 3 wt. % NaOH) and the FA aqueous solution (FA:water=0.2:0.2 mol) and also, under the conditions shown in Table 2, and the results are shown in FIG. 4.

Figure 4:
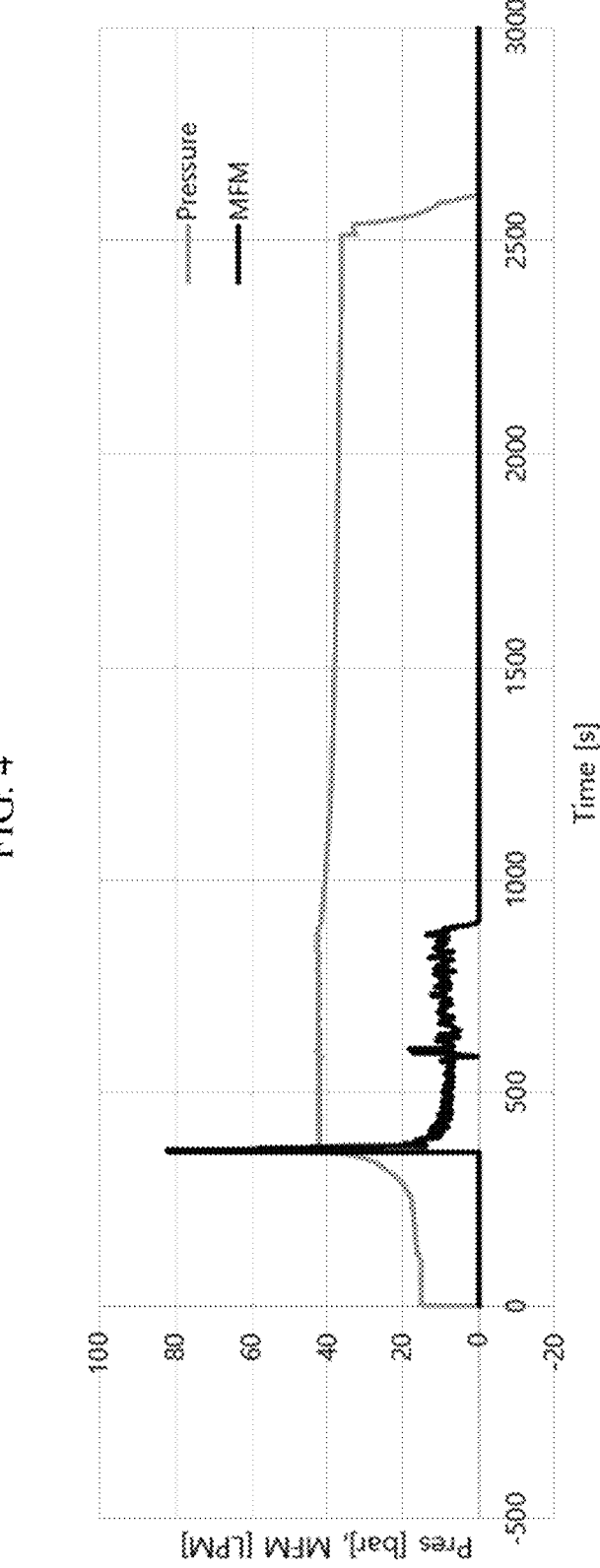
FIG. 4 is a graph showing the evaluation results of simultaneous injection between a chemical hydride aqueous solution and an acid aqueous solution in Experimental Example 2.

In FIG. 4, MFM represents a mass flow meter.

TABLE 2

| Injection order of aqueous solution | Injection time (min) | Insulation or not | SBH aqueous solution temperature (° C.) | Cooling water flow rate (LPM, 20° C. water) | Conversion rate (%) |
|---|---|---|---|---|---|
| Simultaneous injection of SBH and FA aqueous solutions | SBH: 8.5 g/min FA: 1 g/min | No | 40 | No separate cooling | 90 or greater (Based on injection amount) |

Referring to FIG. 4, most of the injected SBH aqueous solution is confirmed to participate in a hydrogen generating reaction (a conversion rate of greater than or equal to 90%).

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: chemical hydride storage unit
110: chemical hydride storage tank
120: water storage tank
130: mixer
200: reaction unit
210: dehydrogenation reactor
220: acid aqueous solution storage tank
230: cooling water storage tank
300: hydrogen storage unit
320: moisture trap
330: methanator
400: recovery unit
410: product storage tank
500: fuel cell

610, 620, 630, 640, 650: first to fifth pumps
710, 720, 730, 740, 750: first to fifth valves

What is claimed is:

1. A dehydrogenation reaction device comprising:
a chemical hydride storage unit including a chemical hydride storage tank;
a reaction unit including an acid aqueous solution storage tank configured to store an acid aqueous solution, and a dehydrogenation reactor configured to generate hydrogen by reacting a chemical hydride with the acid aqueous solution;
a hydrogen storage unit including a hydrogen storage tank configured to store the hydrogen produced in the dehydrogenation reactor; and
a recovery unit for recovering a product produced in the dehydrogenation reactor,
wherein the chemical hydride storage unit further includes a water storage tank configured to store water, and a mixer configured to prepare a chemical hydride aqueous solution by mixing the chemical hydride and the water,
wherein the chemical hydride storage unit is configured to supply the chemical hydride aqueous solution to the dehydrogenation reactor,
wherein the chemical hydride aqueous solution and the acid aqueous solution are configured to be in contact with each other within three seconds after injection into the dehydrogenation reactor,
wherein the dehydrogenation reactor includes a first nozzle configured to spray the chemical hydride aqueous solution and a second nozzle configured to spray the acid aqueous solution, and
wherein the first nozzle or the second nozzle includes a radial injector for atomizing the chemical hydride aqueous solution or the acid aqueous solution.

2. The dehydrogenation reaction device of claim 1, wherein the chemical hydride storage tank includes the chemical hydride and a stabilizer comprising sodium hydroxide (NaOH), potassium hydroxide (KOH), lithium hydroxide (LiOH), cesium hydroxide (CsOH), or a combination thereof.

3. The dehydrogenation reaction device of claim 1, wherein the chemical hydride storage unit is configured to inject the chemical hydride directly from the chemical hydride storage tank into the dehydrogenation reactor.

4. The dehydrogenation reaction device of claim 1, wherein the chemical hydride aqueous solution comprises:
20 wt. % to 80 wt. % of the chemical hydride;
1 wt. % to 10 wt. % of the stabilizer; and
a balance amount of the water.

5. The dehydrogenation reaction device of claim 1, wherein the chemical hydride aqueous solution is configured to be injected into the dehydrogenation reactor simultaneously with the acid aqueous solution or is configured to be injected into the dehydrogenation reactor after the acid aqueous solution is injected first.

6. The dehydrogenation reaction device of claim 1, wherein the chemical hydride aqueous solution is configured to be heated to a temperature in a range of 30° C. to 80° C. and injected into the dehydrogenation reactor.

7. The dehydrogenation reaction device of claim 1, wherein the reaction unit further includes a cooling water storage tank for maintaining a temperature of the dehydrogenation reactor in a range of 100° C. to 400° C.

8. The dehydrogenation reaction device of claim 1, wherein the hydrogen storage unit further includes a moisture trap, a methanator, a filter, or a combination thereof for separating the hydrogen from a mixed gas produced in the dehydrogenation reactor at a front end of the hydrogen storage tank.

9. The dehydrogenation reaction device of claim 1, wherein the recovery unit is configured to recover the product from the dehydrogenation reactor in a liquid state when a temperature of the product is greater than or equal to 40° C.

10. The dehydrogenation reaction device of claim 1, wherein the recovery unit includes a product storage tank configured to receive a mixed gas and the product produced in the dehydrogenation reactor, and to transfer the mixed gas to a front end of the hydrogen storage unit.

11. The dehydrogenation reaction device of claim 10, wherein the product storage tank is configured to be discharged by evaporating moisture contained in the product.

12. The dehydrogenation reaction device of claim 1, wherein the recovery unit is configured to dissolve and discharge the product by injecting a solvent of greater than or equal to 40° C. into a product storage tank.

13. A control method of a dehydrogenation reaction device of claim 1, the method comprising:

(a) determining whether a hydrogen supply is required to a fuel cell;

(b) determining whether a pressure in the hydrogen storage tank is less than a reference pressure when the hydrogen supply is required to the fuel cell;

(c) mixing the chemical hydride and water to prepare the chemical hydride aqueous solution when the pressure in the hydrogen storage tank is less than the reference pressure;

(d) determining whether an internal pressure of the dehydrogenation reactor is less than a predetermined limit pressure;

(e) injecting the chemical hydride and the acid aqueous solution into the dehydrogenation reactor to perform a dehydrogenation reaction when the internal pressure of the dehydrogenation reactor is less than the predetermined limit pressure;

(f) determining whether the internal pressure of the dehydrogenation reactor is greater than the pressure of the hydrogen storage tank;

(g) supplying hydrogen produced in the dehydrogenation reactor to the hydrogen storage tank when the internal pressure of the dehydrogenation reactor is greater than the pressure of the hydrogen storage tank and returning to step (f);

(h) stopping the injection of the chemical hydride aqueous solution and the acid aqueous solution into the dehydrogenation reactor and transferring the hydrogen in the hydrogen storage tank to the fuel cell when the internal pressure of the dehydrogenation reactor is not greater than the pressure of the hydrogen storage tank;

(i) determining whether the internal pressure of the dehydrogenation reactor is less than a product discharge pressure;

(j) returning to step (g) when the internal pressure of the dehydrogenation reactor is not less than the product discharge pressure;

(k) transferring a mixed gas and the product in the dehydrogenation reactor to a product storage tank, transferring the mixed gas in the product storage tank to the hydrogen storage unit, and then returning to step (a) when the internal pressure of the dehydrogenation reactor is less than the product discharge pressure; and (l) terminating operation when hydrogen supply to the fuel cell is not required.

14. The control method of claim 13, wherein, in step (b), the reference pressure is a pressure configured to be supplied to the fuel cell above atmospheric pressure, wherein, in step (d), the predetermined limit pressure is a maximum allowable pressure at which the dehydrogenation reactor is pressurized by hydrogen, wherein, in step (f), the pressure of the hydrogen storage tank is a normal pressure to a predetermined limit pressure, and wherein, in step (i), the product discharge pressure is a minimum pressure at which the product is configured to be automatically discharged from the dehydrogenation reactor using the mixed gas.

15. The control method of claim 14, wherein the reference pressure is in a range of 10 bar to 20 bar, and wherein the product discharge pressure is in a range of 1 bar to 10 bar.

16. The control method of claim 13, wherein, in step (b), when the pressure of the hydrogen storage tank is not less than the reference pressure, the method moves to step (h) of supplying hydrogen from the hydrogen storage tank to the fuel cell.

17. The control method of claim 13, wherein, in step (d), when the internal pressure of the dehydrogenation reactor is not less than a set limit pressure, the method moves to step (f) of determining whether the internal pressure of the dehydrogenation reactor is greater than the internal pressure of the hydrogen storage tank.

\* \* \* \* \*